United States Patent [19]

Sugano et al.

[11] Patent Number: 5,468,781
[45] Date of Patent: Nov. 21, 1995

[54] POLYPROPYLENE RESIN EXPANDED PARTICLES

[75] Inventors: Toshihiko Sugano; Toshihiro Gotoh, both of Yokkaichi, Japan

[73] Assignees: Mitsubishi Petrochemical Company Limited, Tokyo; Mitsubishi Yuka Badische Company Limited, Yokkaichi, both of Japan

[21] Appl. No.: 396,896

[22] Filed: Mar. 1, 1995

Related U.S. Application Data

[63] Continuation of Ser. No. 198,256, Feb. 18, 1994, abandoned.

[30]   Foreign Application Priority Data

Feb. 18, 1993 [JP] Japan .................................. 5-029180

[51] Int. Cl.[6] ............................... C08J 9/22; C08J 9/228
[52] U.S. Cl. ............................. 521/60; 521/56; 521/58
[58] Field of Search ................................... 521/56, 60, 58

[56]           References Cited

U.S. PATENT DOCUMENTS 4,108,934   8/1978   Rubens et al. .......................... 521/56

FOREIGN PATENT DOCUMENTS 0039756   11/1981   European Pat. Off. .
0450342   10/1991   European Pat. Off. .
0516019   12/1992   European Pat. Off. .

OTHER PUBLICATIONS

Database WPI, Derwent Publications Ltd., AN 250936, JP-A-2 175 227, Jul. 6, 1990.

*Primary Examiner*—Morton Foelak
*Attorney, Agent, or Firm*—Oblon, Spivak, McClelland, Maier, & Neustadt

[57]            ABSTRACT

There are provided polypropylene resin expanded particles which have a uniform bubble size, can be molded with an exceptionally low steam pressure, and can produce an expanded molded product having a good surface appearance and an excellent energy absorption property. The present particles are polypropylene resin expanded particles containing as a base resin an isotactic polypropylene resin polymerized in the presence of a metallocene polymerization catalyst.

8 Claims, No Drawings

5,468,781

POLYPROPYLENE RESIN EXPANDED PARTICLES

This application is a Continuation of application Ser. No. 08/198,256, filed on Feb. 18, 1994, now abandoned.

BACKGROUND OF THE INVENTION

1. Field of the Art

The present invention relates to polypropylene resin expanded particles or beads from which can be prepared an expanded molded product having a uniform foam diameter, good moldability and surface appearance and excellent physical properties, particularly energy absorption property. The expanded particles of the present invention are useful for producing expanded molded products which are used for packaging containers, toys, automobile parts, core materials for helmets, shock-absorbing packaging materials, and numerous other products.

An expanded molded product obtained from polypropylene resin expanded particles has hitherto been used advantageously as a core material for bumpers, a variety of packaging materials, and the like because they have excellent chemical resistance, impact resistance, compression strain restoring ability, and other properties.

As the polypropylene resin, a propylene-$\alpha$-olefin random copolymer in which propylene is copolymerized with an $\alpha$-olefin such as ethylene or butene-1 is primarily used from the standpoint of its expanding property. The copolymer comprises a product obtained by polymerization with a so-called Ziegler-Natta catalyst which is obtained from a titanium chloride and an alkylaluminum.

There has also been proposed an application of a polypropylene having a syndiotactic structure obtained by using a metallocene catalyst as the base of an expanded product (Japanese Patent Laid-Open Publication No. 224832/1992). This proposal made possible the preparation of the expanded products of a propylene homopolymer which have not been obtainable from a propylene homopolymer produced by the use of a Ziegler-Natta catalyst referred to above, but the expanded product has an insufficient energy absorption property per unit weight in compression.

Those expanded molded products obtained from the conventional polypropylene resin expanded particles have not been always satisfactory, particularly, in their energy absorption property per unit weight in compression.

On the other hand, in order to improve the energy absorption property, it is possible to use a method of increasing the stiffness of a resin constituting a foam wall by controlling the comonomer content in a copolymer or by using a resin such as a homopolymer as a base resin.

However, this method, while obviously improving the energy absorption property of the expanded molded product, has been known in the art to have a problem in that, when propylene homopolymers produced by the use of what is called Ziegler-Natta catalyst are used, the expanded particles have irregular foam diameters or an extremely small foam diameter thus resulting in poor fusing between particles as the in-mold expanded molded product or a keloidal surface appearance. The method also has a disadvantage in that, when propylene copolymers with a reduced amount of a copolymer are used, an increased steam pressure is required for satisfactorily fusing the expanded particles.

Thus, the in-mold expanded molded product obtained from conventional polypropylene resin expanded particles did not satisfy simultaneously both physical properties such as energy absorption property and moldability and surface appearance.

An object of the present invention is to solve the above described problems accompanying the conventional polypropylene resin expanded particles and to provide polypropylene resin expanded particles from which in-mold expanded molded products having uniform foam diameter, good moldability and surface appearance and particularly excellent energy absorption property can be prepared.

SUMMARY OF THE INVENTION

As a result of intensive investigations, we have successfully accomplished the above object.

That is, the polypropylene resin expanded particles according to the present invention comprise as a base resin an isotactic propylene polymer obtained by the polymerization of a corresponding monomer or monomers with a polymerization catalyst derived from a metallocene compound.

The reason why the advantages inherent in the present invention are obtainable has not fully been elucidated, but the advantages may possibly be ascribable to the facts that the isotactic polypropylenes produced by the use of a metallocene catalyst may have such unusual linkages of propylene that propylene has been polymerized into the polymer chain in a reverse sequence, namely 2,1-insertion, or propylene has been polymerized into the polymer chain so that all the 3 carbon atoms have been put into the polymer chain, viz. 1,3-insertion, whereby the propylene homopolymer produced may have a low melting point even though it is endowed with high rigidity and that the metallocene catalysts have uniform active sites thereon and the propylene homopolymers produced will be uniform in terms of a molecular weight, a melting point and, when copolymerization is concerned, the comonomer is copolymerized into the polymer chain in a random way and uniform.

DETAILED DESCRIPTION OF THE PREFERRED EMBODIMENT

I. BASE RESIN

The base resin to be expanded in particles or beads in the present invention is isotactic propylene polymer obtained by the polymerization by a polymerization catalyst derived from a metallocene compound.

1. Catalyst

The metallocene polymerization catalyst used in the polymerization of the base resin of the present invention comprises a transition metal compound component having a metallocene structure and a co-catalyst component selected from the group consisting of an alumoxane, a Lewis acid and an ionic compound.

The transition metal compound to be used in the present invention can be any transition metal compound having a metallocene structure having a ligand of a cyclopentadienyl structure which is known for production of isotactic propylene polymers. Preferable examples of such transition metal compounds having a metallocene structure include those represented by the general formula

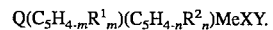

This compound thus has a structure such that two conjugated five-membered rings $C_5H_{4-m}R^1_m$ and $C_5H_{4-n}R^2_n$ crosslinked with a crosslinking group Q, in the form of $Q(C_5H_{4-m}R^1{}_m)(C_5H_{4-n}R^2{}_n)$, are coordinated with the compound of a transition metal of the Group IVB-VIB groups of the Periodic Table, MeXY.

In this connection, while the conjugated five-membered ring groups $C_5H_{4-m}R^1{}_m$ and $C_5H_{4-n}R^2{}_n$ are individually defined, m and n and $R^1$ and $R^2$ are defined in the same manner (described hereinafter in detail). Thus it is needless to say that these conjugated five-membered ring groups may be the same or different. A specific example of the conjugated five-membered ring groups is one where m is 0 (or n is 0), namely a cyclopentadienyl group having no substituents but the crosslinking group Q. When the conjugated five-membered ring group has substituents, namely m≠0 or n≠0, one of the specific examples of $R^1$ (or $R^2$) is a $C_1$ to $C_{20}$, preferably $C_1$ to $C_{12}$ hydrocarbon group, which may be bonded as a monovalent group with the cyclopentadienyl group, or, when two $R^1$ (or $R^2$) are present, they can be bonded at their respective ω-terminus to form a ring, viz. a ring fused with the cyclopentadienyl group. A typical example of the latter is the one wherein two $R^1$ (or $R^2$) are bonded at their respective ω-terminus to form a six-membered ring fused with the cyclopentadienyl group where the 6-membered ring may be unsaturated or saturated, and the conjugated five-membered ring group is thus an indenyl group or a fluorenyl group. In other words, the typical example of the conjugated five-membered ring group is a substituted or unsubstituted cyclopentadienyl, indenyl or fluorenyl group.

Each of $R^1$ (or R2) includes, in addition to the above described $C_1$ to $C_{20}$, preferably $C_1$ to $C_{12}$ hydrocarbon group, a halogen atom such as chlorine, fluorine or bromine atom, an alkoxy group such as a $C_1$ to $C_{12}$ alkoxy group; a silicon-containing hydrocarbon group such as a group containing a silicon atom in the form of $-Si(R^a)(R^b)(R^c)$ and having 1 to ca. 24 carbon atoms; a phosphorus-containing hydrocarbon group such as a group containing a phosphorus atom in the form of $-P(R^a)(R^b)$ and having 1 to ca. 18 carbon atoms; a nitrogen-containing hydrocarbon group such as a group containing a nitrogen atom in the form of $-N(R^a)(R^b)(R^c)$ and having 1 to ca. 18 carbon atoms; or a boron-containing hydrocarbon group such as a group containing a boron atom in the form of $-B(R^a)(R^b)$ and having 1 to ca. 18 carbon atoms. When m (or n) denotes 2 or more and thus a plurality of the group $R^1$ (or $R^2$) are present, these groups may be the same or different. Among these, there are preferably mentioned zirconium compound having a conjugated five-membered ring ligand, which contains a substituent at the 2-, 4- and/or 5-position(s) numbering from the crosslinking group (Q), preferably an indenyl group, a tetrahydroindenyl group, an azurenyl group or a derivative thereof having a substituent at the 2-position, more preferably a lower alkyl group at the 2-position.

Q is a bonding group which crosslinks the two conjugated five-membered ring ligand. Particularly, it includes (a) a lower alkylene or cycloalkylene group which can have a substituent thereon of an alkyl group of preferably 1 to 4 carbon atoms, an alicyclic group of preferably 5 to 7 carbon atoms and/or an aromatic group, preferably phenyl or a lower alkyl-substituted phenyl, and which contains 1 to 15 carbon atoms preferably a lower alkylene group of 1 to 2 carbon atoms or a cycloalkylene group of 5 to 7, more preferably 6, carbon atoms, which can have the above described substituents, such as a methylene group, an ethylene group, an isopropylene group, a phenylmethylmethylene group, diphenylmethylene group or a cyclohexylene group; (b) a silylene group or an oligosilylene group which can have a substituent thereon of an alkyl group of preferably 1 to 4 carbon atoms, an alicyclic group of preferably 5 to 7 carbon atoms and/or an aromatic group, preferably phenyl or a lower alkyl-substituted phenyl, and which contains 0 to 12 carbon atoms in total, such as a silylene group, a dimethylsilylene group, a phenylmethylsilylene group, diphenylsilylene group, a disilylene group or tetramethylsilylene group; and (c) a hydrocarbon group containing germanium, phosphorus, nitrogen, boron or aluminum, especially $(CH_3)_2Ge=$, $(C_6H_5)_2Ge=$, $(CH_3)P=$, $(C_6H_5)P=$, $(C_4H_9)N=$, $(C_6H_5)N=$, $(CH_3)B=$, $(C_4H_9)B=$, $(C_6H_5)B=$, $(C_6H_5)Al=$ or $(CH_3O)Al=$. More preferable are the aforementioned alkylene group and the aforementioned silylene, particularly the substituted silylene, group.

Me is a transition metal in the Group IVB-VIB of the Periodic Table, preferably titanium, zirconium and hafnium, particularly zirconium.

X and Y, respectively, represent hydrogen atom; a halogen atom; a hydrocarbon group of 1 to 20 carbon atoms, preferably 1 to 10 carbon atoms; an alkoxy group of 1 to 20 carbon atoms, preferably 1 to 10 carbon atoms; an amino group, an alkylamino group of 1 to 20 carbon atoms, preferably 1 to 10 carbon atoms; a phosphorus-containing hydrocarbon group of 1 to 20 carbon atoms, preferably 1 to 12 carbon atoms, especially diphenylphosphine; or a silicon-containing hydrocarbon group of 1 to 20 carbon atoms, preferably 1 to 12 carbon atoms, especially trimethylsilyl group. X and Y may be the same or different. m denotes an integer of $0 \leq m \leq 4$, and n denotes an integer of $0 \leq n \leq 4$.

As appropriate embodiments, there are, for example, those crosslinked with the alkylene group such as ethylenebis(2-methylindenyl)zirconium dichloride, ethylenebis(2-methyl-4,5,6,7-tetrahydroindenyl)zirconium dichloride, ethylenebis(2,4-dimethylindenyl)zirconium dichloride, ethylenebis(2,4,4-trimethyl-5,6,7-trihydroindenyl)zirconium dichloride, ethylenebis(2-methyl-4-phenylindenyl)zirconium dichloride, ethylenebis(2,4-dimethyl-4-hydroazurenyl)zirconium dichloride and ethylenebis(4,5,6,7-tetrahydroindenyl)hafnium dichloride; and those crosslinked with the substituted silylene group such as dimethylsilylenebis(4,5,6,7-tetrahydroindenyl)zirconium dichloride, dimethylsilylenebis(2-methylindenyl)zirconium dichloride, dimethylsilylenebis(2-methyl-4,5,6,7-tetrahydroindenyl)zirconium dichloride, dimethylsilylenebis(2,4-dimethylindenyl)zirconium dichloride, dimethylsilylenebis(2,4,4-trimethyl-5,6,7-trihydroindenyl)zirconium dichloride, dimethylsilylenebis(2,4-dimethyl-4-hydroazurenyl)zirconium dichloride, dimethylsilylenebis(2-methylbenzoindenyl)zirconium dichloride, dimethylsilylenebis(2-methyl-4-phenylindenyl)zirconium dichloride and dimethylsilylene(2-methylindenyl)(fluorenyl)zirconium dichloride.

As the co-catalyst component, there are, for example, alumoxanes such as methylalumoxanes, isobutylalumoxanes and methylisobutylalumoxanes; Lewis acids such as triphenylboron, tris(pentafluorophenyl)boron and magnesium chloride; and ionic compounds such as dimethylaniliniumtetrakis(pentafluorophenyl)borate and triphenylcarbiniumtetrakis(pentafluorophenyl)borate. These co-catalyst components can also be used in the presence of the other organoaluminum compounds such as a trialkylaluminum, for example trimethylaluminum, triethylaluminum or triisobutylaluminum.

2. Base resin

The base resin used in the present invention is an isotactic propylene polymer. Thus, the polymer is obtained by polymerizing the corresponding monomer in the presence of a stereoregular polymerization catalyst, that is the metallocene-based catalyst in the present invention. Examples of the base resin are a propylene homopolymer, a propylene-ethylene random copolymer, a propylene-ethylene block copolymer, and a random or block copolymer of propylene and an α-olefin of 4 to 20 carbon atoms. More preferable are propylene homopolymers, propylene-ethylene random copolymers of an ethylene content of 0.1 to 10%, preferably 0.1 to 6%, by weight, and propylene-butene-1 random copolymers of a butene-1 content of 0.1 to 25%, preferably 0.1 to 15% by weight. Still more preferable are propylene homopolymers.

According to the present invention, a copolymer of propylene with a monomer which could not easily be polymerized in the presence of the conventional Ziegler-Natta catalyst is obtained and can be used as the base resin for preparing the expanded particles as well. Examples of the monomer include (a) cyclic olefins such as cyclopentene, norbornene and 1,4,5,8-dimethano-1,2,3,4,4a, 8,8a-6-octahydronaphthalene, (b) non-conjugated dienes such as methyl-1,4-hexadiene and 7-methyl-1,6-octadiene, and (c) aromatic unsaturated compounds such as styrene divinylbenzene, which can be used in combination in and/or between the groups (a)–(c).

The base resins in the present invention may have a molecular weight such that the melt flow index according to the method of ASTM D 1238 determined at 230° C. and a load of 2.16 kg is 0.01 to 100 g/10 minutes, preferably 0.1 to 50 g/10 minutes.

In this connection, the isotactic polypropylene typically used in the present invention is satisfactory if it has a triad [mm] fraction according to the measurement of $^{13}$C-NMR spectrum of 0.5 or more, but, generally, it is one having a triad [mm] fraction of 0.7 or more, preferably 0.80 or more, more preferably 0.90 or more.

The term "triad [mm] fraction" indicates the ratio (y/x) of the number (y) of a "triad" that is "trimer unit" which is the minimum unit of the stereostructure in the monomer units in an α-olefin polymer, having [mm] (isotactic) structure in the total number (x) of the three isomeric structures of the triad possible; that is [mm], [mr] (heterotactic) and [rr] (syndiotactic). The measurement of $^{13}$C-NMR spectrum for use in the determination of the triads was conducted with a JEOL FX-200 spectrometer (Japan Electron Optics Laboratory, Co., Ltd.) under the conditions of a temperature of 130° C., a measurement frequency of 50.1 MHz, a spectrum width of 8,000 Hz, a pulse interval of 2.0 seconds, a pulse width of 7 microseconds and scanning times of 10,000 to 50,000. The spectrum was analyzed according to the descriptions by A. Zambelli, Macromolecules, 21, 617 (1988) and by Tetsuro Asakura, Abstract of The Soc. of Polymer Sci., Japan, 36 (8), 2408 (1987).

Isotactic propylene polymers are in the form of particles or beads to be expanded. Any methods suitable can be resorted to for obtaining the isotactic propylene polymers in the form of particles or beads. The polymers can be obtained in such a form directly from the polymerization step, or alternatively the polymers can be processed into such a form, as will be described hereinbelow in terms of "additives", by e.g. extruding them into elongated extrudates and cutting them into pellets.

It is within the present invention, to blend additives, other resins and elastomers with the polypropylene resin polymerized in the presence of the metallocene compound as the catalyst provided that they do not impair the effects of the present invention.

As the additives, several additives may be added, those conventionally used such as for example an antioxidant, an ultraviolet light absorber, an antistatic agent, a flame-retardant, a metal inactivating agent, a pigment, a dye and a nucleating agent, can be added according to the necessity. The amount of the additives, which depends on the properties required, is in the range of 20 parts by weight or less, preferably 5 parts by weight or less per 100 parts by weight of the base resin of the present invention.

On the other hand, the resins which can be blended include a variety of resins polymerized in the presence of the Ziegler-Natta catalyst such as a polypropylene resin, a high density polyethylene, a linear low-density polyethylene, and a super-low-density polyethylene; polymers produced by the high pressure method such as a low-density polyethylene, polyolefin resins such as an ethylene-vinyl acetate copolymer, an ethylene-acrylate copolymer, an ethylene-acrylic acid copolymer, an ethylene-methacrylic acid copolymer and an ethylene-carbon monoxide copolymer; and a variety of thermoplastic resins such as an amorphous polystyrene resin, a crystalline polystyrene resin, a vinyl chloride resin, a polyamide resin, a polyacetal resin and a polycarbonate resin. The amount of the resin to be blended is in the range of 100 parts by weight or less, preferably 1 to 50 parts by weight per 100 parts by weight of the base resin.

As the elastomers which can be blended, solid rubbers such as an ethylene-propylene rubber, an ethylene-1-butene rubber, a propylene-1-butene rubber, a styrene-butadiene rubber or a hydrogenated product thereof, or a variety of elastomers such as a polystyrene elastomers, for example a styrene-butadiene block copolymeric elastomer can be used. Preferable elastomers include elastomeric olefin polymers such as an ethylene-propylene rubber, an ethylene-butene-1 rubber and a propylene-butene-1 rubber, preferably those having a Mooney viscosity of 1 to 100 determined by a method of ASTM D 1646 with the L-rotor at 100° C.

The aforementioned and the other components are blended with the polypropylene base resin by a method where the polypropylene base resin is in a fluid state or solid state, but melt kneading is generally used. Kneading is conducted at a desired temperature with a variety of kneaders such as a roll, a screw, a Banbury mixer, a kneader, a blender or a mill. After kneading, the product is granulated into an appropriate size of particles. In this case, any of the strand cut method, the underwater cut method, the hot cut method, the mist cut method, the sheet cut method the freeze grinding method and the melt spray method may be used.

II. EXPANDING OF PARTICLES

According to the present invention, the expanded particles are prepared by the DOKAN method as shown in Illustrative IPC edited by the Patent Office on March 1988; German Patent Laid-Open Publication No. 2107683; and Japanese Patent Laid-Open Publication No. 1344/1981, or the extrusion method (Japanese Patent Laid-Open Publication No. 76230/1983). In the case of the DOKAN method, the expanded particles are prepared by dispersing the base resin particles in water in a closed container, supplying a volatile expanding agent in the closed container, heating the dispersion to a temperature of at least the softening point of the resin particles, opening an outlet provided below the surface of the dispersion in the closed container and discharging the aqueous dispersion containing the resin particles having the expanding agent impregnated therein into an atmosphere (into the atmospheric air) having a pressure lower than that in the closed container. In the preparation of the expanding particles, the container is pressurized with air or nitrogen gas to facilitate the discharge of the dispersion.

According to the present invention, an aliphatic hydrocarbon such as butane, pentane, hexane or heptane or a halogenated hydrocarbon such as trichlorofluoromethane, dichlorodifluoromethane, tetrachloroethane, dichlorotetrafluoroethane, methylene chloride or ethyl chloride can be used alone or in combination of the two or more as the volatile expanding agent. An inorganic gas such as nitrogen, air or carbon dioxide gas can also be used.

The amount of the volatile expanding agent added, which varies depending on the expanding agents and the bulk densities of resin particles of interest, is generally in the range of 10 to 80 parts by weight per 100 parts by weight of the resin particle.

Examples of the dispersant which may preferably be used for dispersing the resin particles in water are inorganic suspending agents such as aluminum oxide, titanium oxide, calcium carbonate, magnesium carbonate (basic), calcium tertiary phosphate and magnesium pyrophosphate; water-soluble polymeric protective colloids such as polyvinyl alcohol, methylcarboxycellulose and N-polyvinylpyrrolidone; and anionic surface active agents such as sodium dodecylbenzenesulfonate, a sodium alkanesulfonate, a sodium alkylsulfate, a sodium olefinsulfate, an acylmethyltaurine and a sodium dialkylsulfosuccinate. Among these, it is preferable to use a combination of calcium tertiary phosphate having a particle diameter of 0.01 to 0.8 μm and sodium dodecylbenzenesulfonate as a suspending aid. The fine tertiary calcium phosphate is obtained by reacting 0.60 to 0.67 mole of phosphoric acid with 1 mole of calcium hydroxide in water.

The amount of water as the dispersing medium is in a proportion of 150 to 1,000 parts by weight, preferably 200 to 500 parts by weight to 100 parts by weight of the resin particles. If it is less than 150 parts by weight, the resin particles tend to cause blocking during pressurization. If it exceeds 1,000 parts by weight, the productivity of the expanded particles is uneconomically decreased.

To the aqueous dispersion of the polypropylene resin particles dispersed in water with the dispersant is supplied a gaseous expanding agent or a fluid expanding agent in a closed container, and the dispersion is heated to a temperature of at least the softening point of the resin particle, so that the pressure within the container is increased with the heating, and the expanding agent is impregnated into the resin particles. The resin particles are discharged together with water from the outlet, for example, a slit or a nozzle, provided at the lower part of the closed container into a lower pressure region (generally into atmospheric air) thus to produce polypropylene resin expanded particles.

In this case, an inorganic gas or an expanding agent may be further added from the outside in order to maintain the pressure within the container during the discharge.

An inorganic gas such as nitrogen, helium, argon, carbon dioxide gas or air is preferably supplied to the closed container to provide pressure before or after the addition of the expanding agent to the closed container in the preparation of the expanded particles. the inorganic gas may be supplied either before or after the heating of the dispersion.

The supply of the inorganic gas such as air, nitrogen gas, helium, argon or carbon dioxide gas facilitates the impregnation of the expanding agent into the resin particles and is thus useful for obtaining low-density polypropylene resin expanded particles.

The expanded particles discharged into air are dried/aged in a compartment at 30° to 65° C. to remove water adhering to the surface and are used for the molding of bumping materials or containers.

The polypropylene resin expanded particles according to the present invention can be in any particle size, but preferably have a particle size such that the particles passes through a sieve having 2.5 meshes and do not pass through a sieve having 30 meshes. The particles may be of various shapes from true spherical to cylindrical.

III. MOLDING

As the method for molding expanded particles or beads into shaped articles, a variety of conventionally well known methods can be used:

(i) the compression molding method in which, after the polypropylene resin expanded particles have been placed in a mold, the particles are compressed so as to reduce the volume by 15 to 50% and are fused together by introducing steam at 1 to 5 kg/cm$^3$.G, and the mold is cooled to obtain a product;

(ii) the method for preparing a product in which, after the expanded particles have preliminarily impregnated with a volatile liquid expanding agent to obtain the secondary expanding capability, they are placed in a mold, heated with steam to cause secondary expansion as well as to fuse the particles together;

(iii) the method for preparing a product in which the expanded particles are introduced into a closed chamber, into which an inorganic gas such as air or nitrogen gas is introduced under pressure, whereby the pressure within the cells of the expanded particles is increased to impart the secondary expanding capability, and the resulting particles with the secondary expanding capability are placed in a mold, heated with steam to carry out secondary expansion as well as to fuse the particles together (the so-called pressurized aging method as disclosed in Japanese Patent Publication No. 23731/1984; U.S. Pat. No. 4,379,859; and EP-53333-A;

(iv) the method in which, into a mold of a pressure raised to 1.0 to 6.0 kg/cm$^2$.G with a pressurized gas, the expanded particles are sequentially introduced portionwise under compression with a pressurizing gas at a pressure higher than the pressure within the mold by 0.5 kg/cm$^2$ or more, the pressure within the mold being maintained at the above stated pressure within the mold during the filling and reduced again to atmospheric pressure after the filling, and the expanded particles are heated with steam and fused together to control the compression rate of the expanded particles represented by the equation:

$$\text{Compression ratio (\%)} = \frac{(W/\rho - V)}{W/\rho} \times 100$$

wherein W, V and ρ, respectively, are defined as follows:

W: weight (g) of the molded product,

V: volume (liter) of the molded product,

ρ: bulk density (g/liter) of the expanded particle in air, in the range of 40 to 70% (Japanese Patent Laid-Open Publication No. 151325/191987);

(v) the method in which, into a mold of a pressure raised to 0.5 to 5.0 kg/cm$^2$.G with a pressurized gas, expanded particles are sequentially filled portionwise the expanded particles having a gas internal pressure obtained by a preliminary pressurizing treatment with a pressurized gas having a pressure higher than that in the mold by 0.5 kg/cm$^2$ or more for 1 hour or more with a pressurizing gas at a pressure higher than the pressure within the mold by 0.5 kg/cm$^2$ or more, the pressure within the mold being maintained at the above stated pressure within the mold during the filling and reduced again to atmospheric pressure after the filling, and the expanded particles are heated with steam and fused together to control the compression rate of the expanded particles represented by the equation set forth above to less than 40% (exclusive of 0%); and (vi) the method for preparing the product in which expanded particles having secondary expanding capability are introduced into a mold cavity or into a mold to fill the same under pressure and heated with steam to conduct secondary expansion as well as to fuse the particles together (Japanese Patent Laid-Open Publication Nos. 256634/1988 and 258939/1988 and U.S. Pat. Nos. 4,777,000 and 4,720,509).

Any of the above described methods may be used and is selected in consideration of the nature of the expanded particles or the shape or density of the molded product.

IV. EXAMPLES

The present invention will be further illustrated in detail with reference to the following examples. "Part" and "%" in the examples are based on weight.

Preparation of base resin (1)

After an autoclave having an internal volume of 150 liters had been thoroughly purged with propylene, 50 liters of dehydrogenated and deoxygenated heptane, 120 g of methylalumoxane having an average oligomerization degree of 16 (TOSO-AKZO) and 120 mg of rac-dimethylsilylenebis(2-methylindenyl)zirconium dichloride synthesized according to the method described in Japanese Patent Laid-Open Publication No. 268307/1992 were charged in the autoclave. The autoclave was heated to 40° C., and propylene was introduced thereinto at a flow rate of 5 kg/hour for 3 hours while the hydrogen concentration at the vapor phase was maintained at 0.5% by volume. After the introduction of propylene, polymerization was conducted for 3 hours. After the polymerization, 2.0 liters of butanol was introduced to conduct reaction at 50° C. for 2 hours, and 30 g of NaOH and 50 liters of pure water were introduced to conduct further reaction for 1 hour. After the reaction, the aqueous layer was separated, and the organic layer was filtered and dried to give a propylene homopolymer in a yield of 7.2 kg.

The polymer had a [mm] fraction of 0.94 according to $^{13}$C-NMR, a flexural rigidity of 12,300 kg/cm$^2$ according to JIS-K7106, a melting peak temperature of 150° C. measured by temperature programming at 10° C./minute according to the differential scanning calorimetry and an MFR of 9 g/10 minute measured at 230° C. according to JIS-K7210.

Example 1

To the propylene homopolymer prepared according to the preparation of base resin (1) was added an antioxidant, viz. 0.05% by weight of YOSHINOX BHT (trade name: YOSH-TOMI SEIYAKU K.K.) and 0.10% by weight of Irganox 1010 (trade name: CIBA-GEIGY K.K.). The blend was extruded into the form of a strand having a diameter of 1 mm$\phi$ single-screw extruder and, after cooling in a water bath, cut into lengths of 2 mm to produce pellets in the form of finely divided particles. A 1,000-g portion of the pellets was placed together with 2,500 g of water, 200 g of tertiary calcium phosphate and 0.2 g of sodium dodecylbenzenesulfonate in a 5 liter autoclave, and 120 g of isobutane was further added. The mixture was heated to 135° C. and maintained at this temperature for 30 minutes. While a compressing gas was supplied from the outside in order to maintain the internal pressure at 23 kg/cm$^2$.G, the valve at the bottom of the autoclave was opened to release the content into the atmosphere. After the expanded particles thus obtained were dried, measurement of the bulk density thereof with a 1 liter graduated cylinder revealed it to be 28 g/liter. The foam of the expanded particles was very uniform and had an average size of 150 μm.

After the expanded particles were sequentially charged under compression into an aluminum mold from a hopper with compressed air, the steam pressure was changed for every 0.5 kg/cm$^2$.G of the change of the pressure in the chamber of the mold, starting from 2.5 kg/cm$^2$.G, to conduct heat molding. The molded product was taken out from the mold after water cooling for 60 seconds and air cooling for 20 seconds.

The molded product had a density of 54 g/liter and was 300 mm long, 300 mm wide and 50 mm thick. It was a molded product having few voids and an excellent surface appearance without unevenness. When the molded product was broken at the center to measure the sectional fusion rate, it had already reached 70% at a steam pressure of 3.0 kg/cm$^2$.G. The results are shown in Table 1.

Comparative Example 1

The procedure in Example 1 was repeated except that a propylene homopolymer prepared by polymerization with the conventional Ziegler-Natta catalyst, namely a combination of TiCl$_3$ (Marubeni-Solvay) with diethylaluminum chloride, and having a flexural rigidity of 13,000 kg/cm$^2$, a melt peak temperature of 159° C. and an MFR of 8 g/10 minute was expanded at a temperature of 150° C. to give expanded particles in a density of 27 g/liter.

The expanded particles thus obtained had a foam diameter of less than 30 μm and were considerably fine, so that the particles not only were fused in a proportion of about 20% at most at a steam pressure of 3.0 kg/cm$^2$.G, but also had a keloidal surface and thus were scarcely fused together. The result is shown in Table 1.

TABLE 1

| | Example 1 | Comparative Example 1 |
|---|---|---|
| Base resin: | | |
| Polymerization catalyst | M. cat.*$^1$ | Z. cat.*$^2$ |
| Polymer | propylene homopolymer (mm fraction: 0.94) | propylene homopolymer (mm fraction: 0.95) |
| Flexural rigidity (kg/cm$^2$) | 12,700 | 13,000 |
| Melt peak temperature (°C.) | 150 | 159 |
| MFR (g/10 min) | 9 | 8 |
| Expanding conditions and moldability: | | |

TABLE 1-continued

|  | Example 1 | | | | Comparative Example 1 | | | |
|---|---|---|---|---|---|---|---|---|
| Expanding temperature (°C.) | 135 | | | | 150 | | | |
| Bulk density of expanded particle (g/l) | 28 | | | | 27 | | | |
| State of foam | average 150 μm; very uniform | | | | less than 30 μm; fine | | | |
| Density of expanded product (g/l) | 54 | | | | 54 | | | |
| Steam pressure (kg/cm$^2$ · G) | 2.5 | 3.0 | 3.5 | 4.0 | 2.5 | 3.0 | 3.5 | 4.0 |
| Fusion (%) | 40 | 70 | 95 | 95 | 10 | 20 | 0 | 0 |
| Appearance of molded product | ○ | ○ | ○ | ○ | x | x | | keloidal |

*[1]M. cat.: Metallocene catalyst
*[2]Z. cat.: Ziegler-Natta catalyst

Preparation of base resin (2).

After an autoclave having an internal volume of 150 liters had been thoroughly purged with propylene, 50 liters of dehydrogenated and deoxygenated heptane, 90 g of methylalumoxane having an average oligomerization degree of 16 (TOSO-AKZO) and 90 mg of rac-dimethylsilylenebis(2-methylindenyl)zirconium dichloride were charged in the autoclave. The autoclave was then heated to 40° C., and propylene and ethylene were introduced at a flow rate of 2.45 kg/hour and 0.039 kg/hour, respectively, for 4 hours. After the introduction of propylene and ethylene, the polymerization was further conducted for 2 hours. After polymerization, 2.0 liters of butanol was introduced to conduct reaction at 50° C. for 2 hours, and 30 g of NaOH and 50 liters of pure water were then introduced to separate the aqueous layer. Next, to another 150 liter autoclave were added 50 liters of pure water, 0.5 liter of "DEMOL EP" (Kao) and 30 g of calcium chloride, and the temperature was raised to 90° C. The slurry obtained previously as described above was introduced at a rate of 2 liters/minute. After the introduction, the mixture was quenched to granulate the polymer. After filtration and drying, a propylene-ethylene random copolymer was obtained in a yield of 5.8 kg. The copolymer had an ethylene content of 2.3% by weight.

Preparation of base resin (3)

The procedure in the preparation of base resin (2) was repeated except that butene-1 was supplied at a rate of 0.078 kg/hour in place of ethylene. As a result, a propylene-butene-1 random copolymer was obtained. The copolymer had a butene-1 content of 4.5% by weight.

Examples 2 and 3

Expanded particles were prepared as in Example 1 except that the polymers obtained in the preparation of base resin (2) and (3) were used as a base resin and the conditions such as expanding temperature and the like were changed as shown in Table 2.

The expanded particles were then molded in the same manner as in Example 1, and the molded product thus obtained was cut into test pieces each measuring 50×50×25 mm to conduct compression tests according to JIS-K6767. From the stress-strain curve, the amount of the unit volume energy absorption (E/A) at 50% strain which is calculated by the stress at 50% strain (kg/cm$^2$)×the energy absorption efficiency×0.5 (cm/cm) was obtained and shown in Table 2.

In this connection, as for the steam pressure for molding, the pressure at which the fusion rate was 60% was recorded. The appearances of the molded products were visually judged by the following criteria: ⊙: smooth surface of the molded product and no void between particles; ○: smooth surface of the molded product but significant voids; Δ: lack of smoothness of the surface of the molded product and significant voids; x: the molded product in the shape of a millet-and-rice cake having a high rate of voids.

Comparative Examples 2 and 3

Expanded particles were prepared as in Comparative Example 1 except that the base resin and the expanding temperature were changed as shown in Table 2.

The results are shown in Table 2.

TABLE 2

|  | Example 1 | Comparative Example 1 | Example 2 | Comparative Example 2 | Example 3 | Comparative Example 3 |
|---|---|---|---|---|---|---|
| Base resin: | | | | | | |
| Polymerization catalyst | M. cat. | Z. cat. | M. cat. | Z. cat. | M. cat. | Z. cat. |
| Polymer | propylene homopolymer | propylene homopolymer | propylene-ethylene random copolymer (ethylene content: 2.4 wt %) | propylene-ethylene random copolymer (ethylene content: 2.7 wt %) | propylene-butene-1 random copolymer (butene content: 4.5 wt %) | propylene-butene-1 random copolymer (butene content: 4.5 wt %) |
| Flexural rigidity (kg/cm$^2$) | 12700 | 13000 | 8200 | 8400 | 11300 | 11500 |
| Melt peak temperature (°C.) | 150 | 159 | 137 | 149 | 140 | 155 |
| MFR (g/10 min) | 9 | 8 | 13 | 11 | 16 | 15 |
| Expanding conditions and moldability: | | | | | | |
| Expanding temperature (°C.) | 135 | 150 | 128 | 136 | 134 | 143 |
| Bulk density of expanded | 28 | 27 | 30 | 30 | 30 | 30 |

TABLE 2-continued

|  | Example 1 | Comparative Example 1 | Example 2 | Comparative Example 2 | Example 3 | Comparative Example 3 |
| --- | --- | --- | --- | --- | --- | --- |
| particle (g/l) | | | | | | |
| State of foam | ave. 150 μm; very uniform | less than 30 μm, significantly fine | ave. 250 μm; very uniform | 50–150 μm; wide distribution | ave. 220 μm; very uniform | 30–120 μm; wide distribution |
| Density of expanded product | 54 | 54 | 54 | 54 | 54 | 54 |
| Steam pressure at 60% fusion (g/cm$^2$ · G) | 2.8 | Unfused even at higher steam pressure, because of keloidal surface | 1.8 | 3.0 | 2.3 | 3.3 |
| Appearance of molded product | ⊙ | | ⊙ | ○ | ⊙ | △ |
| Volume E/A (kg · cm/cm$^3$) | 2.4 | | 2.0 | 1.7 | 2.3 | 2.1 |

Preparation of base resin (4)

After an autoclave having an internal volume of 70 liters had been thoroughly purged with propylene, 25 liters of dehydrogenated and deoxygenated heptane, 60 g of MMAO (methylalumoxane) (TOSO-AKZO) and 60 mg of rac-dimethylsilylenebis(tetrahydroindenyl)zirconium dichloride synthesized according to the method described in J. Orgmet. Chem. (342) 21–29, 1988 and ibid (369) 359–370, 1989 were charged in the autoclave. The autoclave was heated to 25° C., during which propylene was introduced thereinto for 30 minutes to elevate the pressure in the autoclave to 5.5 kg/cm$^2$.G. Polymerization was then conducted at 5.5 g/cm$^2$.G and 25° C. for 5 hours. After the polymerization, propylene was purged, the slurry was sent to a catalyst deactivation vessel of an 100 lit. capacity, and 2.0 liters of butanol was introduced to conduct the deactivation reaction at 50° C. for 2 hours, and 30 g of NaOH and 50 liters of pure water were introduced to conduct further reaction for 1 hour. After the reaction, the aqueous layer was separated, and the organic layer was filtered and dried to give a propylene homopolymer in a yield of 5.3 kg.

The polymer had a [mm] fraction of 0.95 according to $^{13}$C-NMR, a flexural rigidity of 13,200 kg/cm$^2$, a melting peak temperature of 152° C. measured by temperature programming at 10° C./minute according to the differential scanning calorimetry and an MFR of 46 g/10 minute measured according to JIS-K7210.

Preparation of base resin (5)

The procedure set forth in Preparation of base resin (4) was followed except for the use of 50 g of MMAO and 50 mg of rac-dimethylsilylenebis(2-methyl-4,5,6,7-tetrahydroindenyl)zirconium dichloride synthesized according to the method described in Japanese Patent Laid-Open Publication No. 268307/1992 and J. Orgmet. Chem. (342) 21–29, 1988 and ibid (369) 359–370, 1989 and for the polymerization conducted at 40° C. and 7 kg/cm$^2$.G for 2 hours.

Propylene homopolymer was obtained in an amount of 6.2 kg, which was found to have [mm] of 0.965, a flexural rigidity of 13,500 kg/cm$^2$, a melting peak temperature of 154° C. and an MFR of 7 g/10 minutes.

Examples 4 and 5

Procedure for producing expanded particles set forth in Example 1 was followed except for the use of base polymers (4) and (5) produced above and the use of expanding conditions as set forth in Table 3.

Molding of the expanded particles and evaluation of the molded product were also conducted as in Example 1.

The results obtained are set forth in Table 3.

Example 6

To the propylene homopolymer prepared according to the preparation of base resin (1) were added 12% by weight of an ethylene-propylene rubber (EP02P, Japan Synthetic Rubber), and an antioxidant, viz. 0.05% by weight of YOSHINOX BHT (trade name: YOSHTOMI SEIYAKU K.K.) and 0.10% by weight of Irganox 1010 (trade name: CIBA-GEIGY K.K.). The blend was extruded into the form of a strand having a diameter of 1 mmφ with a 45 mmφ single-screw extruder and, after cooling in a water bath, cut into lengths of 2 mm to produce pellets in the form of finely divided particles.

Production of expanded particles and molding of the expanded particles were conducted as in Example 1 except for the particulars set forth in Table 3.

The results obtained are set forth in Table 3.

Comparative Example 4

To a propylene homopolymer used in Comparative Example 1 were added an ethylene-propylene rubber and antioxidants as in Example 6, and fine pellets were produced.

The pellets were processed into expanded particles and further into an expanded molding article as in Example 1 except for the particulars set forth in Table 3.

The results obtained are set forth in Table 3.

TABLE 3

|  | Example 4 | Example 5 | Example 6 | Comparative Example 4 |
|---|---|---|---|---|
| Base resin: | | | | |
| Polymerization catalyst | M. cat. | M. cat. | M.cat. | Z. cat. |
| Polymer | propylene homopolymer | propylene homopolymer | propylene homopolymer/EP rubber: 88/12 (in weight) | propylene homopolymer/EP rubber |
| Flexural rigidity (kg/cm$^2$) | 13,200 | 13,500 | 10,500 | 10,700 |
| Melt peak temperature (°C.) | 152 | 154 | 150 | 159 |
| MFR (g/10 min) | 46 | 7 | 7 | 6 |
| Expanding conditions and moldability: | | | | |
| Expanding temperature (°C.) | 136 | 136 | 134 | 148 |
| Bulk density of expanded particle (g/l) | 25 | 30 | 28 | 30 |
| State of foam | ave. 150 μm; very uniform | ave. 140 μm; very uniform | ave. 180 μm; very uniform | <30 μm; fine |
| Density of expanded product (g/l) | 47 | 54 | 54 | 54 |
| Steam pressure at 60% fusion (g/cm$^2$ · G) | 2.8 | 3.0 | 2.3 | kelloidal even at an elevated steam pressure, little fusion |
| Appearance of molded product | ⊚ | ⊚ | ⊚ | |
| Volume E/A (kg · cm/cm$^3$) | 2.2 | 2.5 | 2.0 | |

As shown by the data set forth in Tables 1–3, the polypropylene resin expanded particles of the present invention, as compared with the conventional ones, have a uniform foam diameter and can be molded with an exceptionally low steam pressure, and the molded articles thus obtained have a good surface appearance and an excellent energy absorption property.

More particularly, propylene homopolymers and propylene copolymers of a low comonomer content which have heretofore been known in the art to produce expanded particles and/or expanded molded articles which are unsatisfactory in the size of bubbles which is excessively small or in the distribution of bubbles which is excessively broad are now capable of production of improved expanded particles and/or expanded molded articles produced therefrom.

What is claimed is:

1. Polypropylene resin expanded particles comprising as a base resin an isotactic propylene polymer obtained by the polymerization of a corresponding monomer or monomers with a polymerization catalyst derived from a metallocene compound, wherein said metallocene compound has a structure of formula:

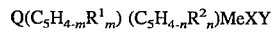

$$Q(C_5H_{4-m}R^1_m)(C_5H_{4-n}R^2_n)MeXY$$

wherein:

$(C_5H_{4-m}R^1_m)$ and $(C_5H_{4-n}R^2_n)$ are conjugated five-membered rings, wherein $R^1$ and $R^2$ are each, independently, selected from the group consisting of $C_1$–$C_{20}$ hydrocarbon groups, halogens, silicon-containing $C_1$–$C_{24}$ hydrocarbon groups, phosphorous containing $C_1$–$C_{18}$ hydrocarbon groups, nitrogen containing $C_1$–$C_{18}$ hydrocarbon groups, and boron containing $C_1$–$C_{18}$ hydrocarbon groups, wherein when two $R^1$'s or two $R^2$'s are present, the $R^1$'s or the $R^2$'s can be bonded at their respective ω-terminus to form a ring; m denotes an integer of $0 \leq m \leq 4$; and n denotes an integer of $0 \leq n \leq 4$;

Q is a bonding group which crosslinks the conjugated five-membered rings;

Me is a transition metal in Group IVB-VIB of the Periodic Table; and

X and Y are each, independently; selected from the group consisting of hydrogen, halogen, $C_1$–$C_{20}$ hydrocarbon groups, $C_1$–$C_{20}$ alkoxy groups, an amino group, $C_1$–$C_{20}$ alkylamino groups, silicon-containing $C_1$–$C_{24}$ hydrocarbon groups and phosphorous containing $C_1$–$C_{18}$ hydrocarbon groups.

2. Particles according to claim 1 which have a particle size such that said particles pass through a sieve having 2.5 meshes and do not pass through a sieve having 30 meshes.

3. Particles according to claim 1, wherein said isotactic propylene polymer is an isotactic propylene homopolymer.

4. Particles according to claim 1, wherein said isotactic propylene polymer is an isotactic propylene copolymer containing 0.1 to 10% by weight of ethylene copolymerized therewith or 0.1 to 25% by weight of butene-1 copolymerized therewith.

5. The polypropylene resin expanded particles as claimed in claim 1, wherein the isotactic propylene polymer has a triad [mm] fraction according to the measurement of $^{13}$C-NMR spectrum of 0.7 or more.

6. The polypropylene resin expanded particles as claimed in claim 5, wherein the [mm] is 0.8 or more.

7. The polypropylene resin expanded particles as claimed in claim 5, wherein the [mm] is 0.9 or more.

8. The polypropylene resin expanded particles as claimed in claim 1, wherein the isotactic propylene polymer is selected from the group consisting of an isotactic propylene homopolymer and an isotactic propylene copolymer containing 0.1 to 10% by weight of ethylene copolymerized therewith or 0.1 to 25% by weight of butene-1 copolymerized therewith.

* * * * *